United States Patent
Sugahara

(10) Patent No.: US 10,798,268 B2
(45) Date of Patent: Oct. 6, 2020

(54) IMAGE PROCESSING APPARATUS, METHOD OF CONTROLLING THE SAME, AND STORAGE MEDIUM FOR SWITCHING A SHOW-THROUGH REMOVAL PROCESS BASED ON A HALFTONE-DOT REGION

(71) Applicant: CANON KABUSHIKI KAISHA, Tokyo (JP)

(72) Inventor: Asako Sugahara, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/431,843

(22) Filed: Jun. 5, 2019

(65) Prior Publication Data

US 2019/0394357 A1    Dec. 26, 2019

(30) Foreign Application Priority Data

Jun. 20, 2018 (JP) ................ 2018-117311

(51) Int. Cl.
*H04N 1/40* (2006.01)
*H04N 1/409* (2006.01)
*H04N 1/00* (2006.01)
*H04N 1/62* (2006.01)

(52) U.S. Cl.
CPC ......... *H04N 1/4095* (2013.01); *H04N 1/0097* (2013.01); *H04N 1/62* (2013.01)

(58) Field of Classification Search
None
See application file for complete search history.

(56) References Cited

U.S. PATENT DOCUMENTS

| 7,292,375 | B2 * | 11/2007 | Nishida | H04N 1/4095 358/3.26 |
| 7,777,920 | B2 * | 8/2010 | Shoda | H04N 1/4095 358/463 |
| 8,164,809 | B2 * | 4/2012 | Ohkawa | H04N 1/4095 358/1.9 |
| 9,025,170 | B2 * | 5/2015 | Nakamura | H04N 1/00037 358/1.13 |
| 2002/0071131 | A1 * | 6/2002 | Nishida | H04N 1/4095 358/1.9 |
| 2004/0174546 | A1 * | 9/2004 | Guleryuz | G06K 9/00456 358/1.9 |
| 2015/0256715 | A1 * | 9/2015 | Ikari | H04N 1/4095 358/3.24 |

(Continued)

FOREIGN PATENT DOCUMENTS

JP     2015171099 A     9/2015

*Primary Examiner* — Dung D Tran
(74) *Attorney, Agent, or Firm* — Carter, DeLuca & Farrell LLP

(57) ABSTRACT

An image processing apparatus according to embodiments obtains a variance value of signal values of pixels included in a predetermined region of the read image read from an original, and compares the obtained variance value with a threshold value for determining whether the read image has a halftone dot region. Furthermore, the present image processing apparatus, upon determining that the read image includes a halftone dot region in accordance with the result of this comparison, executes a first removal process for removing the reflection of an image of one surface of an original when reading the other surface, and executes a second removal process otherwise.

13 Claims, 10 Drawing Sheets

(56) References Cited

U.S. PATENT DOCUMENTS

| | | | |
|---|---|---|---|
| 2015/0373227 A1* | 12/2015 | Ikari | G06K 15/1869 |
| | | | 358/2.1 |
| 2016/0014302 A1* | 1/2016 | Oosaki | H04N 1/4095 |
| | | | 358/509 |
| 2017/0064147 A1* | 3/2017 | Sugahara | H04N 1/4072 |
| 2017/0201648 A1* | 7/2017 | Sugahara | H04N 1/407 |

\* cited by examiner

| No. | INPUT VALUE | OUTPUT VALUE | OUTPUT VALUE (SHOW-THROUGH COUNTERMEASURES TAKEN) |
|---|---|---|---|
| 1 | (0,0,0) | (0,0,0) | (0,0,0) |
| ⋮ | ⋮ | ⋮ | ⋮ |
| 12 | (204,204,204) | (204,208,205) | (255,255,255) |
| 13 | (221,221,221) | (222,225,224) | (255,255,255) |
| 14 | (238,238,238) | (235,236,239) | (255,255,255) |
| 15 | (255,255,255) | (255,255,255) | (255,255,255) |

IMAGE PROCESSING APPARATUS, METHOD OF CONTROLLING THE SAME, AND STORAGE MEDIUM FOR SWITCHING A SHOW-THROUGH REMOVAL PROCESS BASED ON A HALFTONE-DOT REGION

BACKGROUND OF THE INVENTION

Field of the Invention

The present invention relates to an image processing apparatus, a method of controlling the same, and a storage medium.

Description of the Related Art

In an image forming apparatus, such as a copying machine or a multi function peripheral, a problem referred to as "show-through" may occur in a case of using an image reading apparatus (a scanner) installed in the image forming apparatus to read an original. "Show-through" is something where, in a case where one surface of an original (a front surface) is read by an image reading apparatus, an image of the other surface of the original (a back surface) is captured in a read image. In other words, show-through mainly occurs if some kind of image is printed on both sides (the front surface and the back surface) of the original read by the image reading apparatus. This show-through is likely to occur if a high density image is present on the back surface. It also occurs in response to a degree of thickness (an amount of light transmission) of the medium (such as paper) of the read original, and the amount of light from a light source when reading. If show-through occurs, the image in the read image becomes harder to see—in other words, the quality of the image degrades.

Accordingly, consideration is made for various show-through removal methods, and a method that can remove show-through that occurs overlapping (covering) a halftone dot region of low density to medium density portions of image data of the front surface, in addition to show-through with respect to a paper white region, has been proposed. For example, in Japanese Patent Laid-Open No. 2015-171099, show-through is effectively removed by giving attention to a value of variance between a region in which show-through is occurring inside a halftone dot region, and a region in which show-through is not occurring. This method executes processing based on an assumption that there is the same variance value for halftone dot regions of the same density inside an image. Show-through removal is performed by calculating a variance value and an average value for each local region of the image, and, if there are regions with average values that differ by the same variance value, correcting a target pixel of a region whose average value is darker by taking a value of a region whose average value is lighter as an index.

However, there is a problem in the foregoing conventional technique as is described below. For example, in the conventional technique described above, because a variance value of a halftone dot region is used as hint information in the show-through removal process, suitable show-through removal is not possible if there is no halftone dot region in image data of the front surface. Specifically, in an original such as a photographic paper photograph or an original printed by error diffusion, a variance value for a local region may become a similar value overall. Accordingly, there is a problem in that it is not possible to calculate a correct amount of correction, and a highlight region of the image data of the front surface which should actually be kept is removed, and image quality degrades.

SUMMARY OF THE INVENTION

The present invention enables realization of a mechanism for, in accordance with the existence or absence of a halftone dot region in an image formed on a front surface of a sheet, suitably switching a show-through removal process, and reducing degradation of image quality.

One aspect of the present invention provides an image processing apparatus comprising: a memory device that stores a set of instructions; and at least one processor that executes the set of instructions to: obtain a variance value of signal values of pixels included in a predetermined region of a read image read from an original; compare the obtained variance value with a threshold value for determining whether the read image has a halftone dot region; and in accordance with a result of comparison, in a case where it is determined that a halftone dot region is included in the read image, execute a first removal process for, when one surface of the original is read, removing a reflection of an image of the other surface, and execute a second removal process in a case where it is determined that a halftone dot region is not included in the read image.

Another aspect of the present invention provides a method of controlling an image processing apparatus, the method comprising: obtaining a variance value of signal values of pixels included in a predetermined region of a read image read from an original; comparing the obtained variance value with a threshold value for determining whether the read image has a halftone dot region; and in accordance with a result of comparison, in a case where it is determined that a halftone dot region is included in the read image, executing a first removal process for, when one surface of the original is read, removing a reflection of an image of the other surface, and executing a second removal process in a case where it is determined that a halftone dot region is not included in the read image.

Still another aspect of the present invention provides a non-transitory computer-readable storage medium storing a computer program for causing a computer to execute each step of a method for controlling an image processing apparatus, the method comprising: obtaining a variance value of signal values of pixels included in a predetermined region of a read image read from an original; comparing the obtained variance value with a threshold value for determining whether the read image has a halftone dot region; and in accordance with a result of comparison, in a case where it is determined that a halftone dot region is included in the read image, executing a first removal process for, when one surface of the original is read, removing a reflection of an image of the other surface, and executing a second removal process in a case where it is determined that a halftone dot region is not included in the read image.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Note that description is given by example, taking a multi function peripheral (a digital multi function peripheral/MFP) as an image processing apparatus according to embodiments. However, application is not limited to a multi function peripheral, and may be to any apparatus that has an image processing function.

First Embodiment

<Configuration of Image Reading Apparatus>

Figure 1:
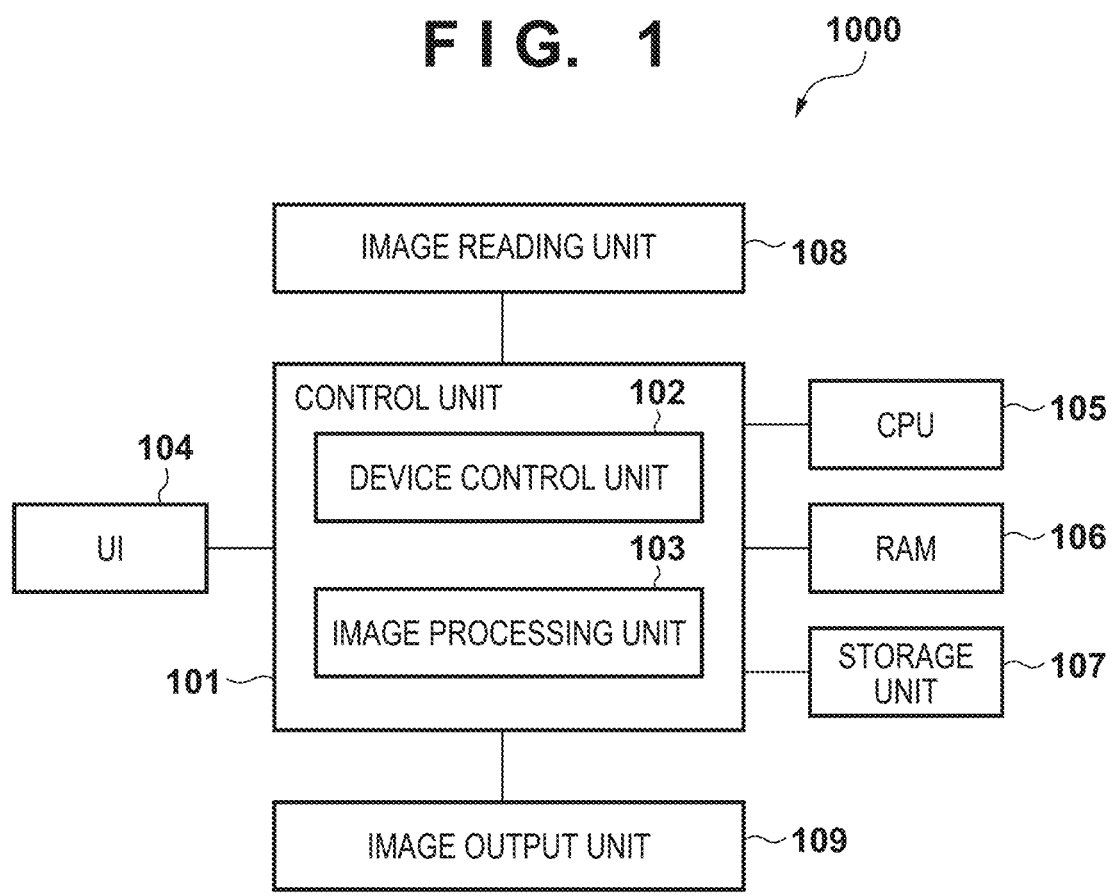
FIG. 1 is a block diagram illustrating a configuration of an image processing apparatus.

Description is given below regarding a first embodiment of the present invention, with reference to the attached drawings. Firstly, with reference to FIG. 1, description is given for an example of a configuration of an image processing apparatus in the present embodiment. Here, because description is only given for blocks of a minimum necessary configuration, the image processing apparatus of the present invention may include other configurations.

An image processing apparatus 100 is provided with a control unit 101, a UI 104, a CPU 105, a RAM 106, a storage unit 107, an image reading unit 108, and an image output unit 109. The control unit 101 is provided with a device control unit 102 for controlling the image forming apparatus, and an image processing unit 103 for optimizing image data. The control unit 101 uses the CPU (Central Processing Unit) 105 and the RAM (Random Access Memory) 106 to obtain an image from the image reading unit 108, or process image data and store it in the storage unit 107. Furthermore, the control unit 101 may output an image, through the image output unit 109, to a recording device such as a sheet or a monitor.

Various settings are notified to the control unit 101 by the UI (user interface) 104 which is a mouse, a keyboard, or the like, and the image processing unit 103 processes image data based on a notified setting. Alternatively, a value set by the UI 104 is saved in the storage unit 107 through the device control unit 102. The image processing unit 103 reads a saved setting value, and then processes image data. The storage unit 107 stores a parameter for controlling the apparatus, an application for realizing the present embodiment, an OS, and the like.

The configuration described above is a minimum necessary configuration of the image processing apparatus 100 for a user side. An image processing apparatus of the present invention may include other configurations, and may include a network interface such as a router or a firewall, as necessary. In addition, an image processing system may be configured by adding an information processing apparatus such as PC or the like which is connected to the image processing apparatus, and executing some processing of the image processing apparatus 100 in the information processing apparatus.

<Image Processing Unit>

Figure 2:
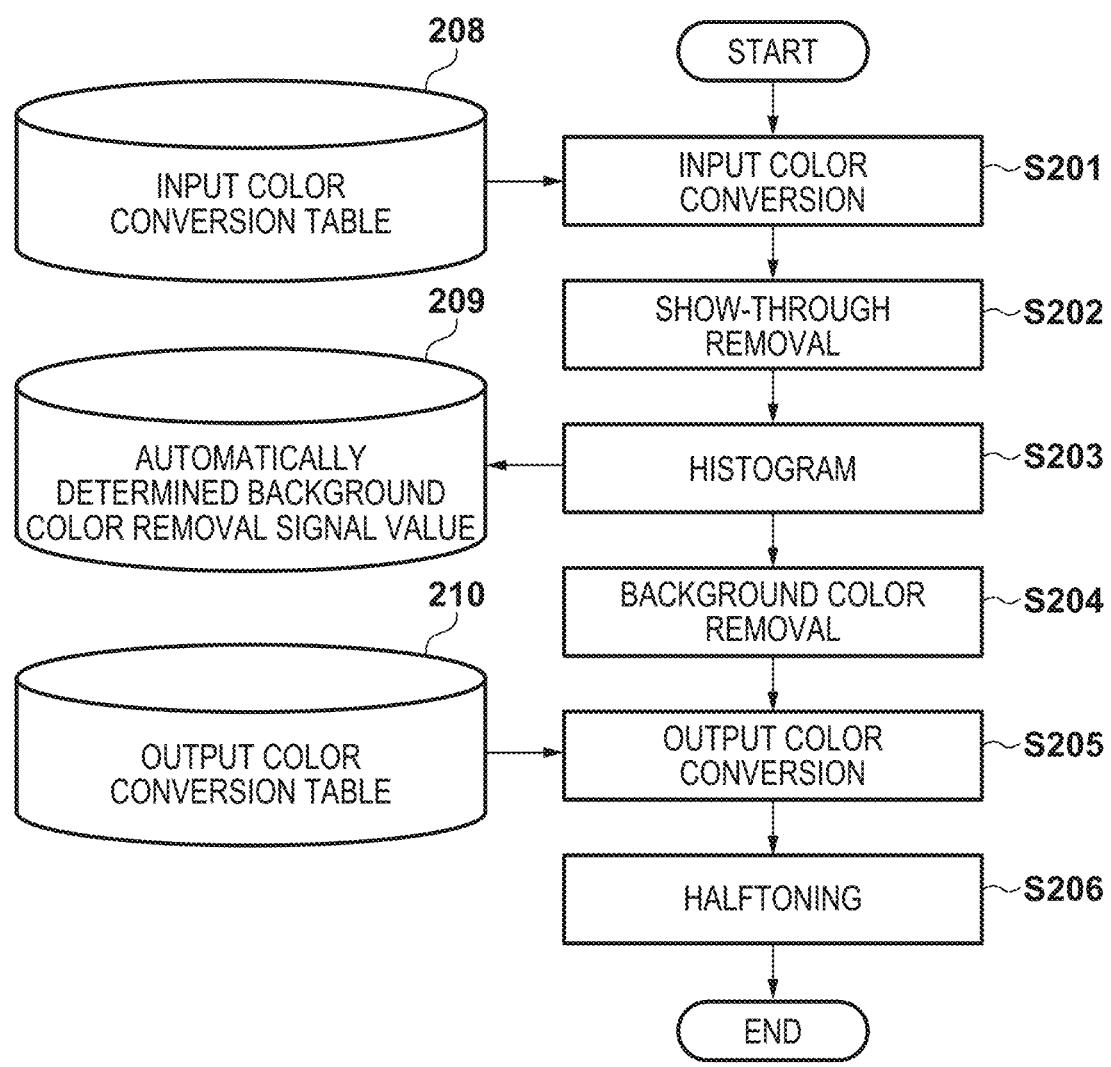
FIG. 2 is a block diagram illustrating a configuration of an image processing apparatus.

Next, with reference to FIG. 2, description is given regarding a processing procedure of the image processing unit 103. It is assumed that the processing described below is realized by being executed by an ASIC (Application Specific Integrated Circuit) (not shown) inside the image processing unit 103.

In step S201, the image processing unit 103 uses an input color conversion table 208 to execute an input color conversion process to make a conversion from device-dependent RGB values to device-independent RGB values for image data obtained by the image reading unit 108. The input color conversion table is a three-dimensional lookup table (hereinafter abbreviated as a 3D-LUT). Next, in step S202, the image processing unit 103 executes a show-through removal process based on a show-through removal algorithm which is described later in detail.

Next, in step S203, the image processing unit 103 generates a histogram of signal values (may be referred to as pixel values below) of each channel out of R, G, and B of the image, and, for example, calculates a background color removal signal value 209 for an automatic determination which is used when a background color removal level of "automatic" is set in the UI 104. Next, in step S204, the image processing unit 103 uses a 1D-LUT (a one-dimensional lookup table) to execute a background color removal process for making where there is a predetermined signal value or greater be white.

Next, in step S205, the image processing unit 103 uses an output color conversion table 210 to execute an output color conversion process for converting an RGB value of an image to a CMYK value, where CMYK indicate toner colors. Next, in step S206, the image processing unit 103 performs a halftone process such as a screen process or an error diffusion process. The above explained processing is the minimum necessary image processing when copying, but other necessary processing such as an image area determination process or a filtering process may be added.

<Show-Through Removal Process (First Removal Process)>

Figure 3:
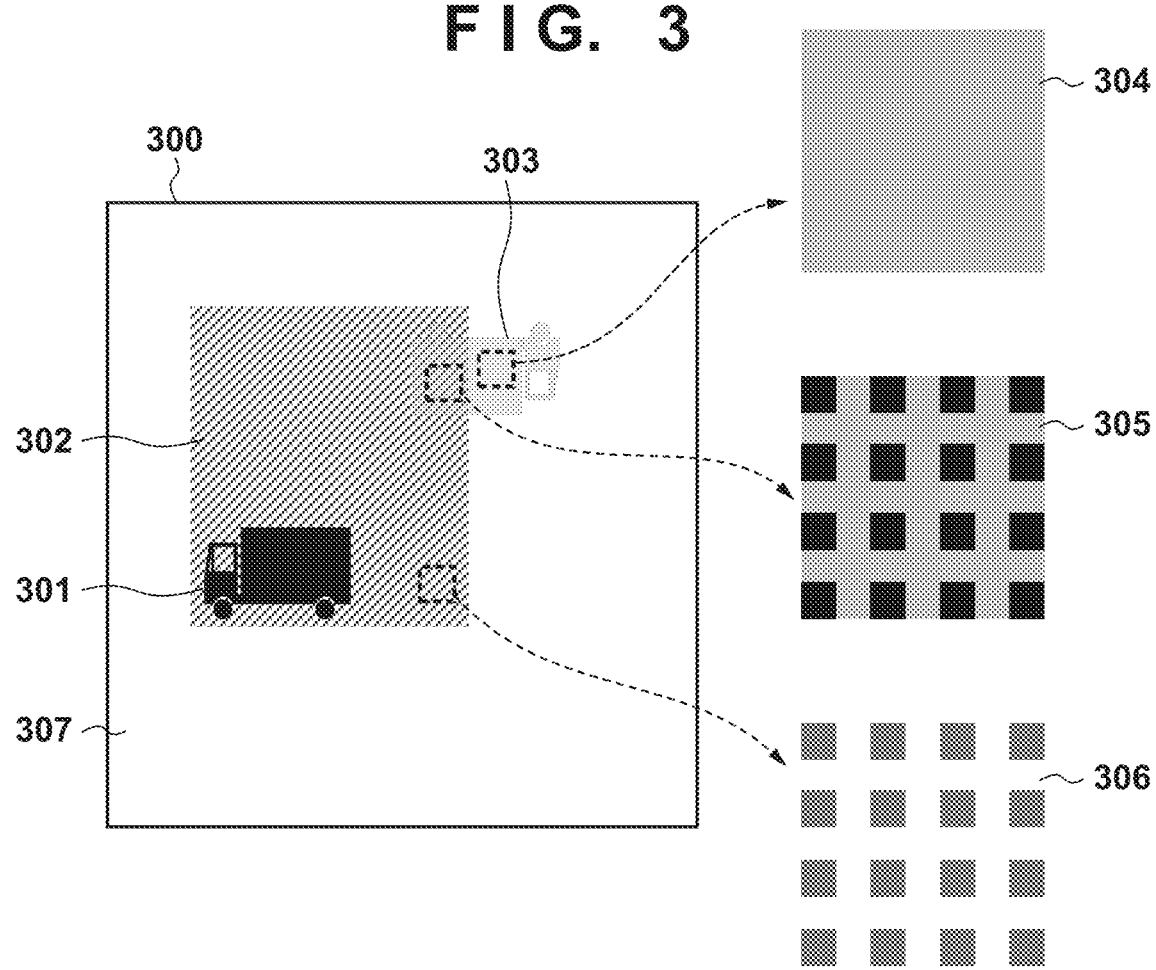
FIG. 3 exemplarily illustrates read image data.
Figure 4:
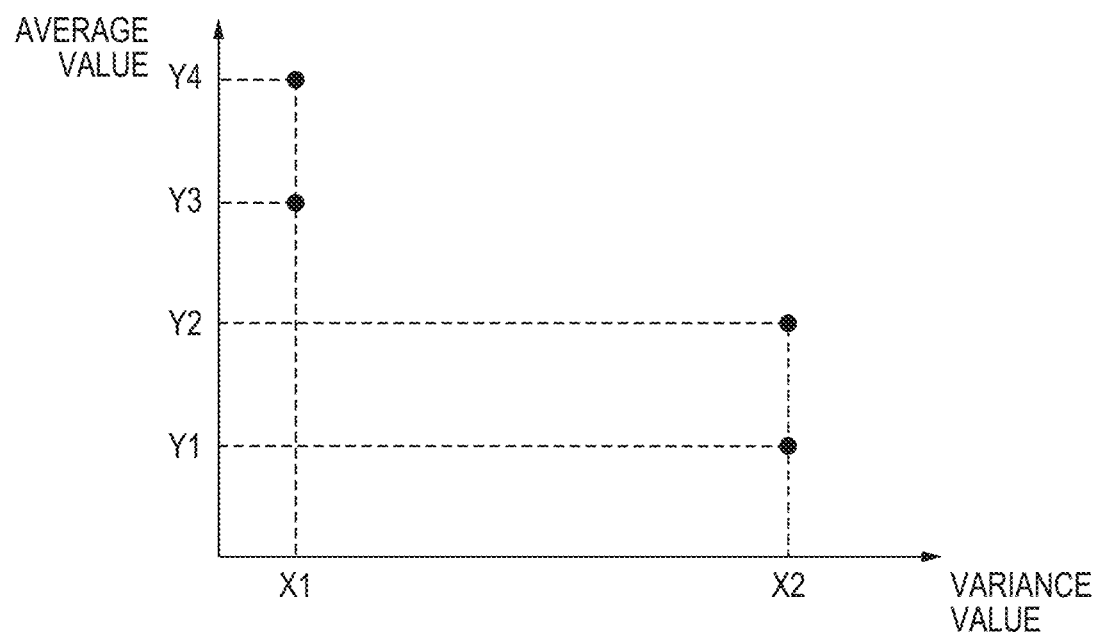
FIG. 4 is a block diagram that illustrates a relationship between an average value and a variance value of luminance values in read image data.

Next, with reference to FIG. 3 and FIG. 4, description is given regarding details of a show-through removal process (a first removal process) for removing even show-through inside a halftone dot, in step S202 described above. FIG. 3 is a view for explanatorily illustrating read image data 300 obtained by reading an original by the image reading unit 108. More specifically, the read image data 300, in which a show-through image 303 is included, is illustrated. In FIG. 3, halftone dots generated by the halftone process of step S206 described above are printed on the original. Additionally, the halftone process of step S206 is not limited to a screen process, and may be an error diffusion process.

Only a high density image 301 (an image of a truck) and a halftone image 302 (a rectangular image) expressed by halftone dots are image-formed on the front surface of the original. Also, it is assumed that an image that is similar to the high density image 301 is image-formed on the back surface of the original (the opposite surface to the surface that is read in by the scanner), for example. Here, the high density image that exists on the back surface of the original occurs as the show-through image 303 (an inverted truck image), in the read image data 300 read by the image reading unit 108. Reference numeral 307 is the background color itself of the original. Description is given regarding characteristics of each region of the read image data 300.

A magnification view that focuses on a region of the halftone image 302 is illustrated as a halftone region of interest 306. The halftone region of interest 306 is of a halftone dot structure, and pixels are divided into those in regions in which there is a halftone dot, and those in regions in which there is no halftone dot. Here, these regions are divided by a predetermined window size, and the variance value and the average value of pixel density (a signal value) are calculated, and the variance value is made to be "X2" and the average value is made to be "Y2". Here, for the window size, a size of 5×5 pixels is specified, where the size of one halftone dot is made to be a pixel standard, for example.

A magnification view that focuses on a region of the show-through image 303 is illustrated as a show-through region of interest 304. In the show-through region of interest 304, the region is divided by a predetermined window size, an average value and a variance value of pixel density are calculated, and the variance value is set to be "X1" and the average value is set to be "Y3". Here, the variance value "X1" obtained in the show-through region of interest 304 is a small value. This is because, in general, only a low frequency component of the image on the back surface (an image component that is obtained through the paper) tends to appear as a show-through component. For this reason, if the image on the back surface corresponding to the show-through image 303 were drawn in halftone dots, it is often the case that for the show-through component it would occur without an unevenness in density (luminance), and as a result, the variance value would be a small value.

Also, it is assumed that, in the read image data 300, a variance value and an average value obtained after dividing a paper white region, in which no image exists and for which there is no show-through, by the predetermined window size are "X1" and "Y4" respectively. Additionally, as described above, because the show-through component tends not to influence the variance value, the variance value for a paper white region and the variance value obtained from a region of the show-through image 303 tend to be similar values. For this reason, it is assumed that the variance value is "X1" which is common here.

A magnification view in which a region in which the halftone image 302 and the show-through image 303 are overlapping is focused on is illustrated as an overlapping region of interest 305. The overlapping region of interest 305 is of a halftone dot structure, and thus is divided for each pixel into regions in which there is a halftone dot and regions in which there is no halftone dot. However, because of the influence of the show-through image, the pixel values are dark (low luminance) on the whole. In the overlapping region of interest 305, the region is divided by the predetermined window size, the variance value and average value are calculated, and the variance value is set to be "X2" while the average value is set to be "Y1". Additionally, as described above, because the show-through component tends not to have an influence on the variance value, the variance value of the overlapping region of interest 305 tends to be a similar value to the variance value obtained from the halftone region of interest 306 of the halftone image 302 in which there is no show-through. For this reason, it is assumed that the variance value is "X2" which is common here.

FIG. 4 is a view for illustrating a relationship between the variance values X1 and X2 and the average values Y1-Y4 in the read image data 300. In FIG. 4, the coordinates (X1, Y4) indicate the paper white region, the coordinates (X1, Y3) indicate the show-through region of interest 304, the coordinates (X2, Y2) indicate the halftone region of interest 306, and the coordinates (X2, Y1) indicate the overlapping region of interest 305. In other words, it can be said that the paper white region is the coordinates (X1, Y4), and the coordinates (X1, Y3) is for where the show-through occurs in the paper white region. Also, it can be said that the halftone region of interest 306 is the coordinates (X2, Y2), and the coordinates (X2, Y1) is for where the show-through occurs in the halftone region. The average values of FIG. 4 are average values of brightness (for example, luminance), and so this means that Y4 has a higher luminance than Y1.

Thus, if the pixel of interest is corrected using the amount of difference between Y3 and Y4 in the show-through region of interest 304, the signal value of the show-through region will be corrected to the signal value of the paper white region, and the show-through correction will be performed appropriately. Also, if the pixel of interest is corrected using the amount of difference between Y1 and Y2 in the overlapping region of interest 305, the signal value of the overlapping region is corrected to the signal value of the halftone region of interest, and the show-through correction is performed appropriately. In other words, it is possible to make the average value of a region for which there is no show-through be an index for correcting the show-through in each of the variance values.

Here, the variance values are dependent upon the halftone dot amount in the region of interest. The halftone dot amount is, for example, shown by a percentage (0-100%) with respect to a total pixel count of the region of interest of significant pixels included in the region of interest, and is determined uniquely in accordance with the image density. Thus, it can be seen that even in a case where a show-through region or a region in which a show-through and a halftone dot on the front surface are overlapping occurs, the show-through can be corrected appropriately by correcting the signal value by making an average value where there is no show-through be an index for each variance value. Note, "storing the average value for each variance value" in other words means "storing the average value of each halftone dot amount".

However, in order to obtain an appropriate index, it is necessary to obtain an average value of a region in which there is no show-through. In order to easily and appropriately obtain this, a highest average value for each variance value in input image data is used as the index. This means using the fact that a higher (brighter) average value is taken for a region for which there is no show-through than for a region for which there is a show-through. Because it is rare that the entirety of the halftone dot region within the input image data is included in the show-through region, this approach is tolerated sufficiently in practical use.

Also, there are cases in which the variance value is a value for which there is no relationship with the halftone dot amount and is due to the influence of a different image region at an image boundary such as an edge portion of an image. Accordingly, configuration may be taken to perform processing to perform an edge detection, and exclude a region in which an image edge exists.

As described above, the show-through removal process (step S202), which uses an average value for each halftone dot amount, can remove show-through inside a halftone dot region in addition to show-through with respect to a blank portion, and thus has large merit in being effective for removal of various types of show-through. However, it is necessary to be able to properly resolve a halftone dot region in the read image data 300. In other words, it is necessary for the original itself to have a halftone dot region, and for a scan resolution to be a resolution that enables halftone dots of the original to be resolved, and there is a demerit that the effectiveness of the show-through removal relies on the original or the scan resolution.

<Show-Through Reduction Process (Second Removal Process)>

Description is given here regarding a show-through reduction process (a second removal process) that does not use an average value for each halftone dot amount and differs from the show-through removal process (step S202) described above. The show-through reduction process performs processing based on a signal value, from a characteristic where show-through is close to an achromatic color, as with the show-through region of interest 304. Accordingly, the show-through reduction process reduces show-through by using an input color conversion table for which show-through countermeasures have been performed, when the image processing unit 103 performs an input color conversion in step S201. The show-through countermeasures applied to the 3D-LUT are a feature.

Figures 5, 6:
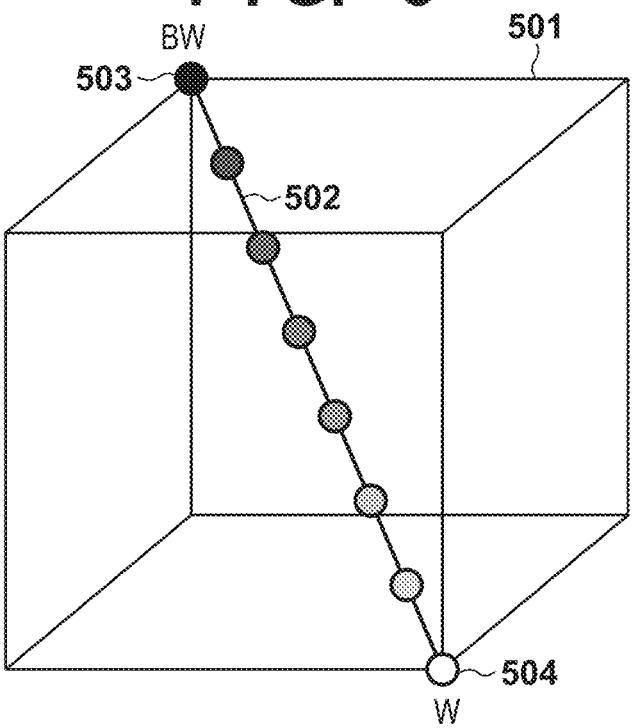
FIG. 5 is a view illustrating a concept of a 3D-LUT.
FIG. 6 is a view illustrating signal values of a 3D-LUT.

With reference to FIG. 5, description is given regarding the 3D-LUT and the show-through countermeasures. Reference numeral 501 represents the 3D-LUT as a whole. Reference numeral 502 is an achromatic axis from black (BW) 503 of the 3D-LUT to white (W) 504, and a situation where a plurality of grid points are arranged on the achromatic axis 502 is illustrated. Note that, as a matter of course, grid points are arranged at points that equally divide the entirely of the 3D-LUT and not just on the achromatic axis.

A characteristic of a show-through image is that color and shape tend to be blurred because an image of the back surface of an original is read. In other words, because there is the characteristic that the color of show-through approaches an achromatic color, processing to remove achromatic highlights (grey highlights) is effective to remove show-through. Conversely, because highlights of a highlighter or skin are not reproduced when highlights other than achromatic colors (color highlights) are removed too much, processing that removes grey highlights and does not remove color highlights too much is necessary.

Accordingly, a show-through reduction process according to the present embodiment is characterized in that a grid point output value for the achromatic axis of the 3D-LUT is purposely set to be bright, as a method for predominantly removing grey highlights. By setting an output signal value of a grid point (an achromatic grid point) of a highlight portion on the achromatic axis to white, colors that are in the vicinity of grey highlight are converted into brighter colors, and become white through subsequent background removal in step S204. Accordingly, by combining a 3D-LUT and a 1D-LUT, processing for predominantly removing grey highlights without determining whether or not there is a color highlight portion is possible.

Next, with reference to FIG. 6, description is given regarding details of a data configuration of the 3D-LUT. Details of a method of generating a 3D-LUT are omitted. Reference numeral 601 is 3D-LUT grid point data indicating input values, output values, and output values for when the show-through countermeasures have been applied for a 3D-LUT of 16 grid points for handling 8-bit data. In a 3D-LUT used for an input color conversion when faithfully reproducing a scan image, an input value for a grid point No. 15 (point corresponding to the grid point W 504 in FIG. 5) is (255, 255, 255), and an output value is (255, 255, 255). The input value of a grid point No. 14, which is adjacent on the achromatic axis, is (238, 238, 238), and the output value is (235, 236, 239).

In the show-through countermeasure, the output values for the grid points No. 14 and No. 13 which are not normally white are converted to white. Accordingly, grey highlight whose input values are completely equal amounts for R, G, and B are converted to white, and colors whose input values are not equal amounts for R, G, and B but are close to grey highlights are converted to be brighter than in the original because grid points on the achromatic axis are used at the time of the color conversion.

Next, description is given for merits in background countermeasures that use both of a 3D-LUT and a 1D-LUT. In a case of removing show-through whose signal values are (204, 204, 204), for example, color highlights above the signal value 204 are completely removed when removal is performed by only a 1D-LUT. However, when using both of a 3D-LUT and a 1D-LUT, it is possible to keep color highlights that are removed when using only the 1D-LUT, while completely removing grey highlights by the 1D-LUT.

As described above, the show-through reduction process that uses a 3D-LUT has a merit in that there is an effect of the same show-through removal with respect to any input image. However, there is the demerit that it is not possible to remove show-through of the overlapping region of interest 305 or show-through of a color that has high chroma.

<UI>

Figure 7:
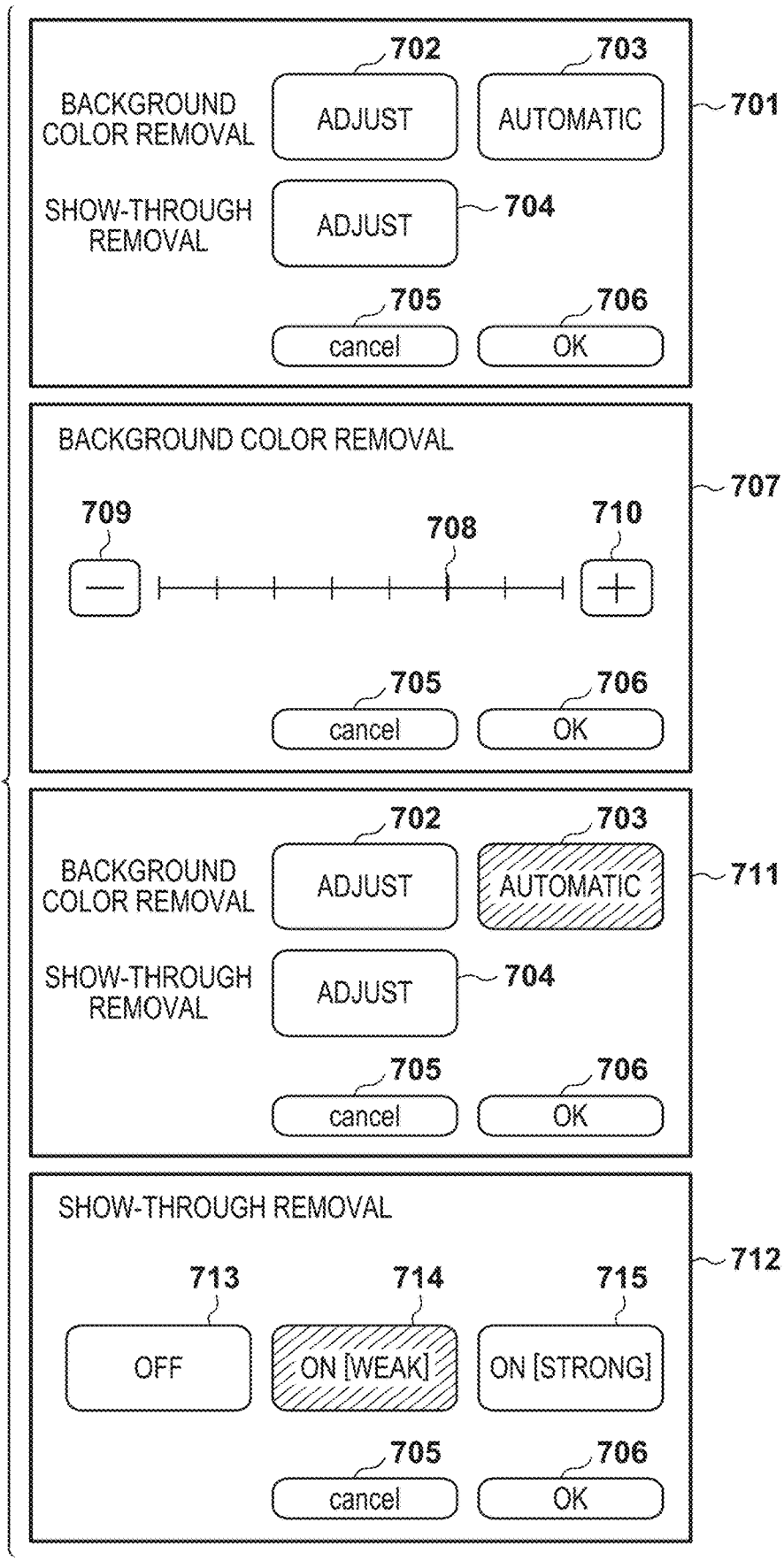
FIG. 7 is a view that illustrates an example of a UI of show-through removal and background color removal.

Next, with reference to FIG. 7, description is given regarding a UI for the show-through removal process (step S202) and the background color removal process (step S204) described above. FIG. 7 represents a setting screen, for show-through removal and background color removal, that is displayed on the UI 104.

Reference numeral 701 is a detailed setting screen for a signal removal process in a copy function screen (not shown) which is displayed on the UI 104. A mode for performing various settings in addition to a color mode, an original type, and density adjustment is also provided on the copy function screen. The setting screen 701 includes a background color removal adjustment button 702, a background color removal automation button 703, and a show-through removal adjustment button 704, which are for performing settings relating to background color removal. Furthermore, the setting screen 701 includes a cancel button 705 for canceling settings, and an OK button 706 for saving settings.

Reference numeral 707 is a screen displayed when the background color removal adjustment button 702 is pressed, and is an adjustment screen for adjusting a background color removal level in accordance with a user input. In the background color removal adjustment screen 707 is displayed gradations indicating a background color removal adjustment level, and a cursor 708 indicating a background color removal level. Furthermore, the adjustment screen 707 includes a minus button 709 for adjustment in a direction for more removal of background color, a plus button 710 for adjustment in a direction for less removal of background color, the cancel button 705 for canceling settings, and the OK button 706 for saving settings. In the adjustment screen 707, when the plus button 710 has been pressed and the cursor 708 is at the most rightward gradation, there is a setting to not remove any background color at all. Because the background color 307 is not pure white when an original that is a blank sheet is read by the image reading unit 108, a background color removal level for whitening the background color 307 of a blank sheet is set by default. However, there is no restriction on how to set a background color removal signal value corresponding to a background color adjustment level or a default background color removal level.

Reference numeral 711 indicates a setting screen 701 when the background color removal automation button 703 has been pressed. The background color removal automation button 703 is for processing that is effective if the background color 307 of an original is itself dark, such as with a newspaper or colored paper, and it is possible to perform a removal after automatically determining the level of the background color 307.

Reference numeral 712 is a screen displayed when the show-through removal adjustment button 704 is pressed, and is an adjustment screen for setting a show-through removal strength level in accordance with a user input. The adjustment screen 712 for show-through removal includes an OFF button 713 for a setting not to perform show-through removal, a weak button 714 for performing show-through removal at a first level, and a strong button 715 for performing show-through removal at a second level stronger than the first level. In other words, the weak button 714 and the strong button 715 are buttons for setting strength levels for a show-through removal process. Furthermore, the adjustment screen 712 includes the cancel button 705 for canceling settings, and the OK button 706 for saving settings. One of the three settings is selected by default, and the adjustment screen 712 for show-through removal illustrated in FIG. 7 illustrates a state in which the weak button 714 has been activated. The weak button 714 and the strong button 715 are examples, and configuration may be taken to have the OFF button 713 and one ON button. Alternatively, more strength levels may be provided. In addition, it is also possible to allocate a show-through removal process that differs to that of the weak button 714 and the strong button 715.

<Regarding a Target Image According to the Present Embodiment>

Figure 8:
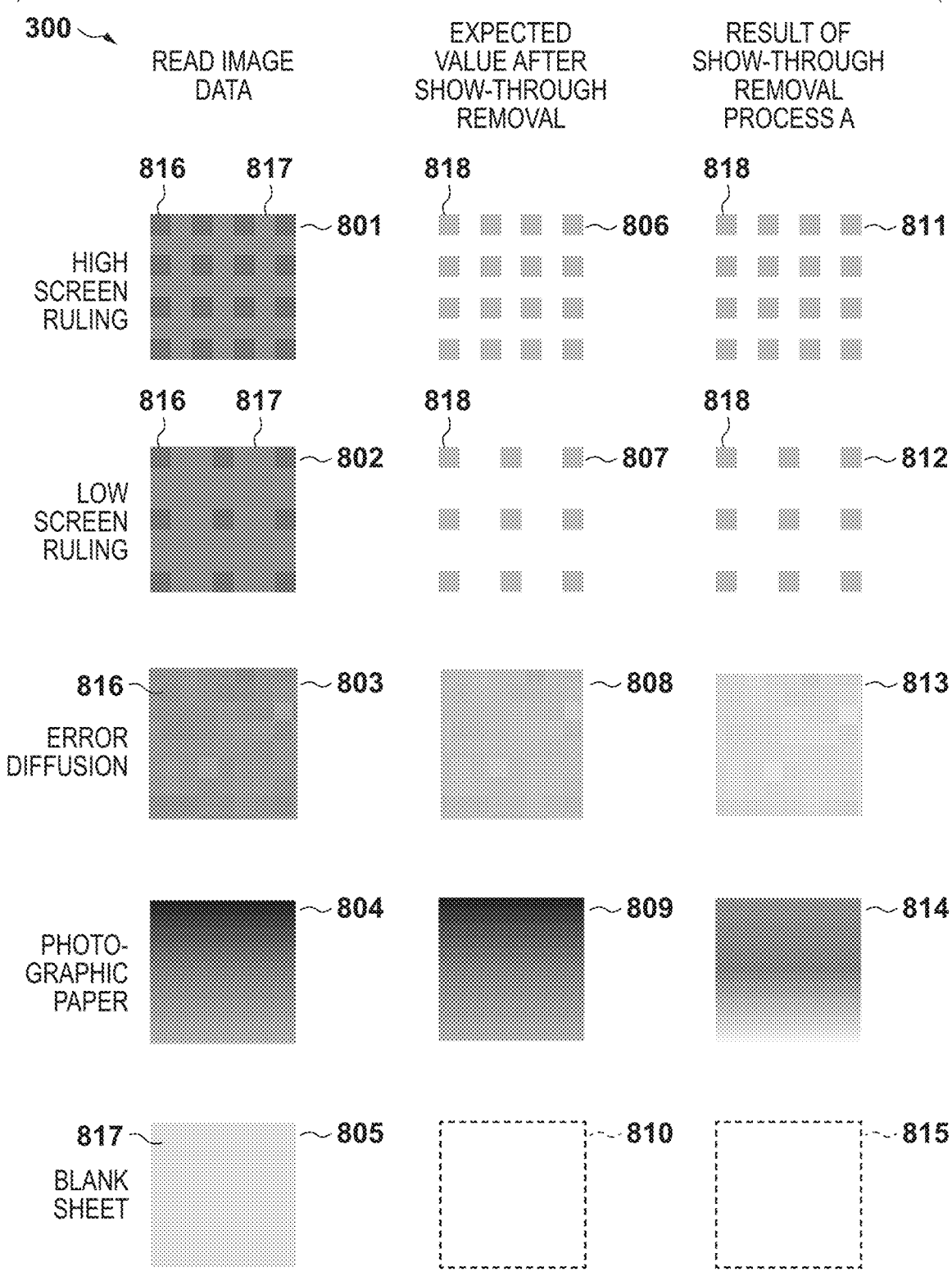
FIG. 8 is a view that schematically illustrates a result of a show-through removal process.

Next, with reference to FIG. 8, description is given for detail of a target image according to the present embodiment.

Reference numerals 801 to 805 are views that exemplify local regions (predetermined regions) of the read image data 300 in which the show-through image 303 is included, for various originals. Reference numeral 801 indicates the overlapping region of interest 305 of an original formed with a high screen ruling, with which the number of lines of a screen is high. Reference numeral 802 indicates the overlapping region of interest 305 of an original formed with a low screen ruling, with which the number of lines of a screen is low. Reference numeral 803 indicates the overlapping region of interest 305 of an original formed by error diffusion. Reference numeral 804 indicates a surface image of a silver halide photograph developed on photographic paper. Reference numeral 805 indicates a surface image of a blank sheet. Reference numerals 801 to 803 and 805 represent states where the high density image 301 shows through. With the silver halide photograph image 804, an image is formed only on one surface because special paper coated with a solvent is used for the front surface, and there is no show-through because the paper itself is thick. Accordingly, reference numeral 804 represents a surface image with no show-through.

In the high screen ruling image 801 and the low screen ruling image 802, because show-through is occurring in halftone dot regions, each pixel is divided into those in regions in which there is a halftone dot, and those in regions in which there is no halftone dot. However, on the whole there are dark (low luminance) pixel values, and reference numeral 816 indicates a region of a halftone dot and a show-through component, while reference numeral 817 is a region of a show-through component.

In the error diffusion image 803, when read by the image reading unit 108, the halftone dot structure of the front surface of the original is corrupted to lose the convex-concave-like pattern of the halftoning, and a show-through component is mixed therein. Accordingly, the entirety is made up of halftone dots and the show-through component region 816. Show-through occurs on a blank sheet to be the show-through component region 817.

Reference numerals 806 to 810 schematically represent images with expected results for when the show-through removal process (step S202) is performed with respect to the images of reference numerals 801 to 805. For the high screen ruling image 801, the low screen ruling image 802, and the error diffusion image 803, only the show-through component is removed, and an image in which only a halftone dot region 818 of the surface image remains is the expected result. For the silver halide photograph image 804, an image in which the read image data 300 remains unchanged is the expected result. For the blank sheet 805, a pure white state where the show-through component has been removed is the expected result.

Reference numerals 811 to 815 schematically represent results when the show-through removal process (step S202) is actually performed with respect to the images of reference numerals 801 to 805. For the high screen ruling image 801 and the low screen ruling image 802, the show-through component has been suitably removed and only the halftone dot region 818 remains, resulting in an image as per the expected result. For the error diffusion image 803, not only have show-through components been removed, but surface image signals have also brightened somewhat. In the silver halide photograph image 804, surface image signals have brightened somewhat. The blank sheet 805 becomes pure white as the show-through component has been suitably removed, resulting in an image as per the expected result.

In this way, because the error diffusion image 803 and the silver halide photograph image 804 lack a halftone dot structure on the read image data 300, a variance value which represents a halftone dot amount which is decided in accordance with an image density becomes a value that is similar overall. Accordingly, when removing show-through with the brightest average value for each variance value as an index, a brighter than necessary correction will be made, influenced by the bright regions in the image. As understood from the above, in the show-through removal process (step S202), when there is no halftone dot structure in the read image data 300, there is a problem in that the signal of the front surface will become too bright, influenced by bright regions in the image. However, it is understood that the show-through removal process (step S202) is effective with respect to the high screen ruling image 801 and the low screen ruling image 802.

<Processing Flow According to the Present Embodiment>

Figure 9:
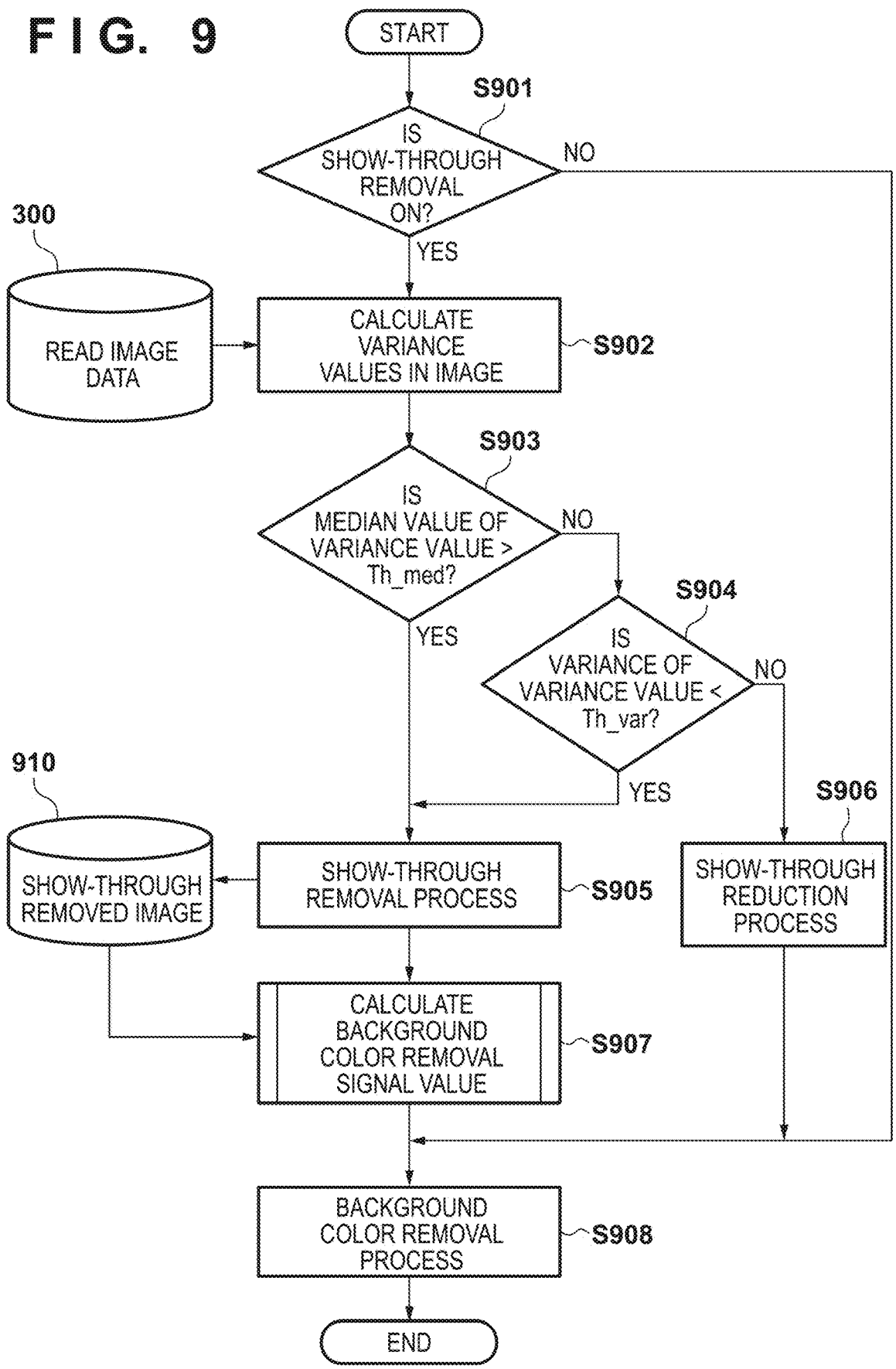
FIG. 9 is a view that illustrates a flow of processing according to an embodiment.

Next, with reference to FIG. 9, description is given regarding a method for appropriately switching the show-through removal process in accordance with the read image data 300, according to the present embodiment. The processing described below is realized by, for example, the control unit 101 loading a control program stored in the storage unit 107 into a work memory, and then executing the control program. Note that this flowchart is executed when an image is read from an original by the image reading unit 108.

In step S901, the control unit 101 checks setting details set via the adjustment screen 712 for show-through removal. If the OFF button 713 is activated, the image processing unit 103 executes a background color removal process in step S908 without executing a show-through removal process, and then processing ends. In addition, if the weak button 714 or the strong button 715 have been activated, the processing proceeds to step S902, and the image processing unit 103 calculates variance values in an image in the read image data 300, and saves them to the storage unit 107. The variance values in the image are calculated over the whole image, where a variance value is for a 5×5 pixel image region, for example. For example, a variance value is calculated in accordance with Equation (1) below.

$$\text{Variance value } (\sigma^2) = \frac{1}{N}\sum_{k=1}^{N}(X_k - X_a)^2 \quad \text{[EQUATION 1]}$$

Here N is the number of pixels in an image region of interest, $X_k$ is the value of the k-th pixel signal in the image region of interest, and $X_a$ is an average value of the pixel signal values in the image region of interest. Note that, because the variance value ($\sigma^2$) gets large, it may be replaced by a standard deviation value ($\sigma$). In addition, another statistical quantity such as a histogram or a difference between pixel values may be used if it is a statistical quantity that enables a degree of variation of a pixel value to be discriminated.

Figure 10:
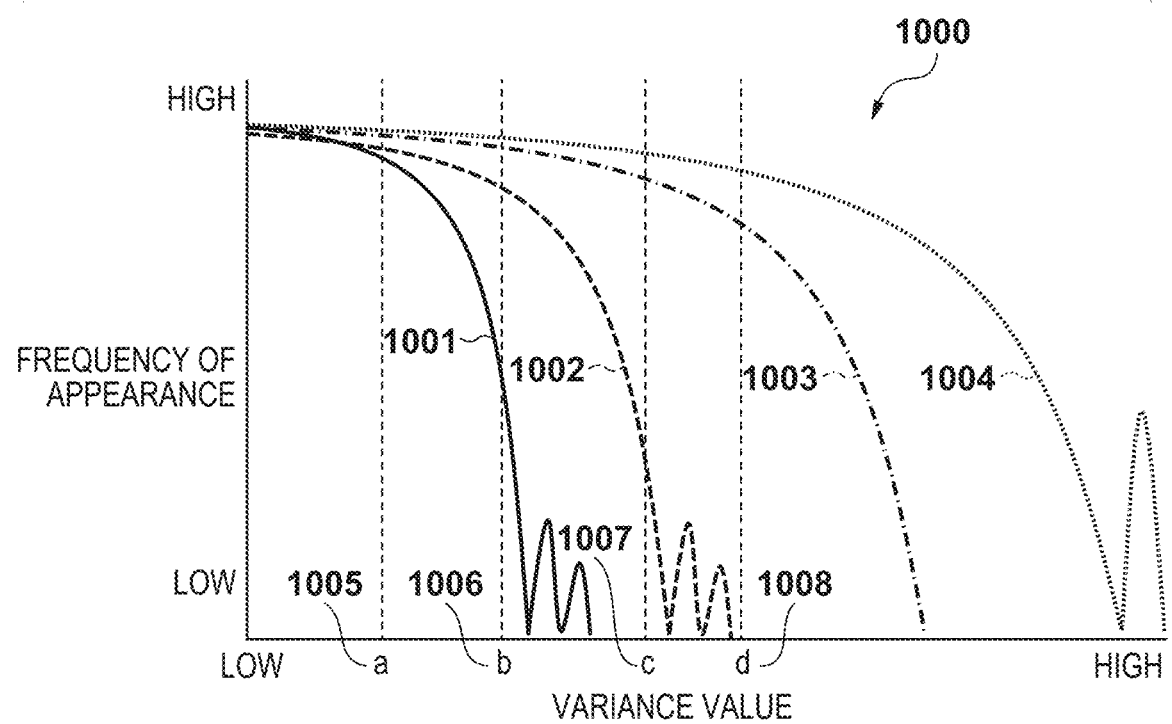
FIG. 10 is a view illustrating features of variance values of an image.
Figure 10:
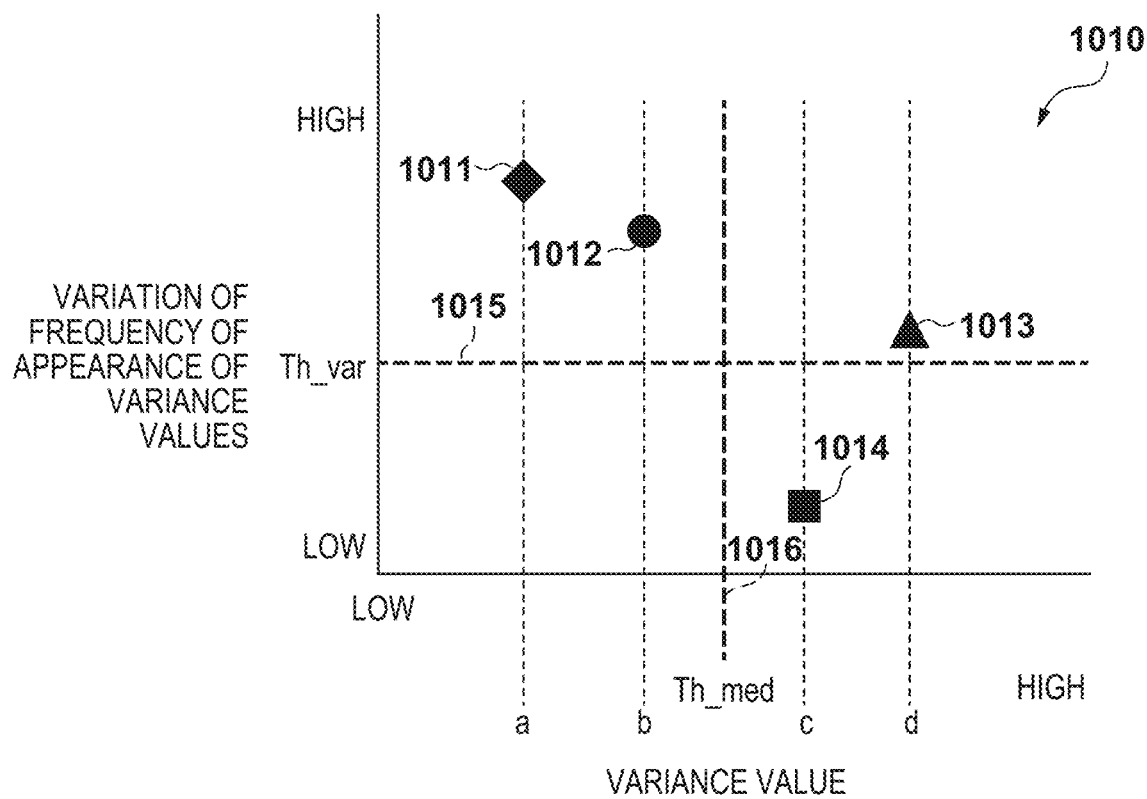

FIG. 10 illustrates examples of calculated variance values. Reference numeral 1000 is a variance value graph that plots the frequency of appearance of variance values calculated from the different types of the read image data 300 illustrated in FIG. 8, with the abscissa representing variance values, and the ordinate representing frequency of appearance. Furthermore, with regard to the frequency of appearance, illustration is made after normalization to 256 levels (8-bit), for example, in order to suppress the data amount for variance values.

A solid line graph 1001 indicates variance values for the silver halide photograph image 804, and a dashed line graph 1002 indicates variance values for the error diffusion image 803. In addition, the dot-dash line graph 1003 indicates variance values for the low screen ruling image 802, and a dotted line graph 1004 indicates variance values for the high screen ruling image 801. The variance values tend to be low for the error diffusion image 803 and the silver halide photograph image 804, and the variance values tend to be high for the high screen ruling image 801 and the low screen ruling image 802.

An index for making the characteristics of these tendencies be easy to understand is explained next. Reference symbols a to d are, when the frequencies of appearance of variance values of respective images are accumulated from those of low variance values, a variance value that corresponds to the middle of all of the frequencies of appearance in the accumulation is hereinafter referred to as the median value of the variance values. The median value of the variance values 1001 of the silver halide photograph image 804 is indicated by a 1005, and the median value of the variance values 1002 of the error diffusion image 803 is indicated by b 1006. The median value of the variance values 1003 of the low screen ruling image 802 is indicated by c 1007, and the median value of the variance values 1004 of the high screen ruling image 801 is indicated by d 1008. The median value of the variance values tends to be low for the error diffusion image 803 and the silver halide photograph image 804, and the median value of the variance values tends to be high for the high screen ruling image 801 and the low screen ruling image 802.

In addition, reference numeral 1010 of FIG. 10 is a view for illustrating characteristics of variance values. The abscissa indicates the same variance values as the variance value graph 1000, and the ordinate indicates variation of the frequency of appearance of the variance values. Reference numeral 1011 is something that plots tendencies of feature amounts of the variance values of the silver halide photograph image 804, reference numeral 1012 is something that plots tendencies of feature amounts of the variance values of the error diffusion image 803, reference numeral 1013 is something that plots tendencies of feature amounts of the variance values of the low screen ruling image 802, and reference numeral 1014 is something that plots tendencies of feature amounts of variance values of the high screen ruling image 801, as examples. The variance values of reference numerals 1011 to 1014 indicate the median values a to d of the variance values of each image described above, as representative values.

Description is given for variation of the frequency of appearance of the variance values of the ordinate. When an original is read by the image reading unit 108, noise such as for dust on a pressing plate or dust attached to the original is mixed with the read image data 300. In such a case, if there is no halftone dot structure in the read image data 300, the variance value tends to suddenly increase for only regions where noise occurs. In contrast, if there is a halftone dot structure in the read image data 300, because there was a concave-convex-like pattern in the density (luminance) in the first place, there tends not to be an influence on the variance value even if there is some dust. Accordingly, there tends to be a high risk of variation of the frequency of appearance of the variance value getting high in the error diffusion image 803 or the silver halide photograph image 804, and a low risk of variation of the frequency of appearance of the variance values getting high in the high screen ruling image 801 or the low screen ruling image 802. However, there are cases where variation of the frequency of appearance of the variance values gets high by the influence of noise, in accordance with the density or quantity of a halftone dot region of an original, even with the high screen ruling image 801 or the low screen ruling image 802.

From the above features (feature amounts) of the variance value, it is firstly possible to distinguish whether there is a halftone dot structure in the read image data 300 by whether a median value of variance values is low or high. By calculating the features of the variance values of the read image data 300 of various originals in advance and comparing the median values of respective variance values, a threshold value Th_med 1016 (a first threshold value) for discriminating read image data having a halftone dot structure from read image data that does not have a halftone dot structure is decided. In other words, the first threshold value is related to median values of variance values. A method of discriminating median values of variance values is described here, but another statistical amount such as average values of variance values may be used if they are representative values that enable features of variation of signal values inside an image to be captured. Regarding variation of the frequency of appearance of variance values, a maximum value of variation of the frequency of appearance of variance values of the read image data 300 having a halftone dot structure is decided as Th_var 1015 (a second threshold value). In other words, the second threshold value is related to variation of the frequency of appearance in variance values. However, even in an original that is a halftone dot original, if, for example, there are an extremely low number of halftone dot regions in the original, the halftone dot regions are extremely sparse, or the number of lines for halftone dots are extremely low, it is thought that variation of the frequency of appearance of variance values will get high by the influence of noise when the original is read. Accordingly, to remove the influence of such an image, the second threshold value may be decided by a method such as making Th_var 1015 be the maximum value when the top 20% of images are removed from those having the highest variation of the frequency of appearance of variance values. Whether the read image data 300 has a halftone dot structure is essentially separated by the median value of variance values. However, in a case where variation of the image reading unit 108 or Th_med 1016 is set to a high value, it is considered that there may be cases where the median value of variance values is slightly less than Th_med 1016, even if there is a halftone dot structure. To discriminate such an image, Th_var 1015 may be calculated from feature amounts of the read image data 300 which definitely has a halftone dot structure.

Next, in step S903, the control unit 101 reads out the threshold value Th_med 1016 which was calculated in advance and the variance values are saved in the storage unit 107, and calculates the median value from the variance values and compares it with the threshold value Th_med 1016. If the median value of the variance values is greater than Th_med 1016 (exceeds the first threshold value), it is determined that the original has a halftone dot structure, the processing proceeds to step S905, and the image processing unit 103 executes the show-through removal process step S202. In contrast, if the median value of the variance values is less than or equal to Th_med 1016 (less than or equal to the first threshold value), the processing proceeds to step S904, and the control unit 101 calculates variation of the frequency of appearance of the variance values, and compares it with the threshold value Th_var 1015 which is read out from the storage unit 107. If variation of the frequency of appearance of the variance values is less than Th_var 1015 (less than the second threshold value), it is determined that the original has a halftone dot structure, and, in step S905, the image processing unit 103 executes the show-through removal process (step S202) described above, and saves a show-through removed image 910 to the storage unit 107. In contrast, if variation of the frequency of appearance of the variance values is greater than or equal to Th_var 1015 (greater than or equal to the second threshold value), the processing proceeds to step S906, the image processing unit 103 executes a show-through reduction process, and the processing proceeds to step S908. Note that, for threshold values for determinations, configuration may be taken to, for example, separately provide a threshold value for a lower limit for determining whether there is a halftone dot structure, in addition to Th_med 1016, and make the determination of step S904 only when the median value of variance values is between the lower limit threshold value and Th_med 1016.

When the show-through removal process (step S202) is executed with respect to a show-through image in step S905, all signal values get brighter due to the show-through removal process. Accordingly, in step S907, the control unit 101 calculates a background color removal signal value whose details are described later. Next, in step S908, the control unit 101 executes a background color removal process based on the background color removal signal value calculated in step S907, and the processing ends.

<Background Color Removal Process>

Figure 11:
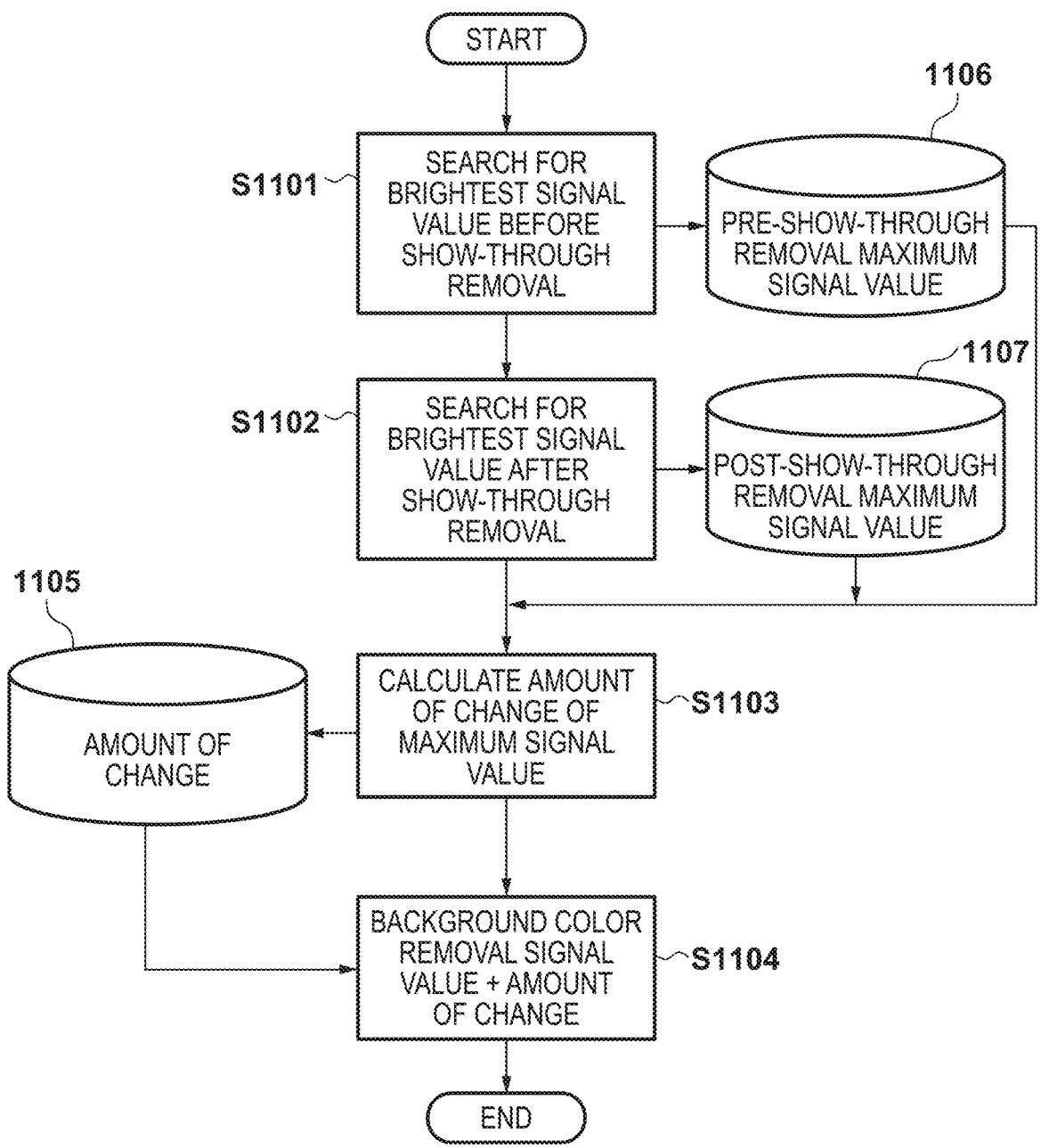
FIG. 11 is a view illustrating a method of calculating a background color removal signal value.

Next, using FIG. 11, description is given regarding the calculation of the background color removal signal value in step S907. The processing described below is realized by, for example, the control unit 101 loading a control program stored in the storage unit 107 into a work memory, and then executing the control program.

In step S1101, the control unit 101 searches the read image data 300 saved in the storage unit 107 for the brightest signal value, and saves it in the storage unit 107 as a pre-show-through removal maximum signal value 1106. Next, in step S1102, the control unit 101 searches the show-through removed image 910 read out from the storage unit 107 for the brightest signal value, and saves it in the storage unit 107 as a post-show-through removal maximum signal value 1107.

Next, in step S1103, the control unit 101 subtracts the pre-show-through removal maximum signal value 1106 from the post-show-through removal maximum signal value 1107 saved in the storage unit 107 to thereby calculate the amount of change in the brightest signal for before and after the show-through removal process. Furthermore, the control unit 101 saves the calculated amount of change in the storage unit 107 as an amount of change 1105. In step S1104, the control unit 101 obtains the background color removal level set via the adjustment screen 707 for background color removal, and obtains the background color removal signal value that was set in advances in accordance with the background color removal level and saved in the storage unit 107. Furthermore, the control unit 101 reads out the amount of change 1105 from the storage unit 107, and adds the amount of change 1105 to the background color removal signal value to set a new background color removal signal value. At this time, configuration may be taken to determine whether to change the background color removal signal value in accordance with the magnitude of the amount of change, and for example, not reflect to the background color removal signal value if the amount of change is less than or equal to 5.

As described above, the image processing apparatus according to the present embodiment obtains a variance value of signal values of pixels included in a predetermined region of the read image read from an original, and compares the obtained variance value with a threshold value for determining whether the read image has a halftone dot region. Furthermore, the present image processing apparatus, upon determining that the read image includes a halftone dot region in accordance with the result of this comparison, executes the first removal process for removing the reflection of an image of one surface of an original when reading the other surface, and executes the second removal process otherwise. In this way, the present image processing apparatus analyzes variance values of the read image data 300 to determine whether there is a halftone dot region, and switches between the show-through removal process (the first removal process) and the show-through reduction process (the second removal process). Accordingly, by virtue of the present embodiment, in accordance with whether there is a halftone dot region in an image formed on the front surface of a sheet, it is possible to appropriately switch the show-through removal process and suppress a reduction in quality of read image data (copied material) such as where pixel signal values brighten more than is necessary.

Second Embodiment

Here, description is given for only portions that differ to the first embodiment described above. The present embodiment proposes, in addition to the configuration and control of the first embodiment described above, a method for switching the show-through removal process in accordance with a setting of an original type, and switching a background color removal signal value in accordance with a level setting for the show-through removal process.

Figure 12:
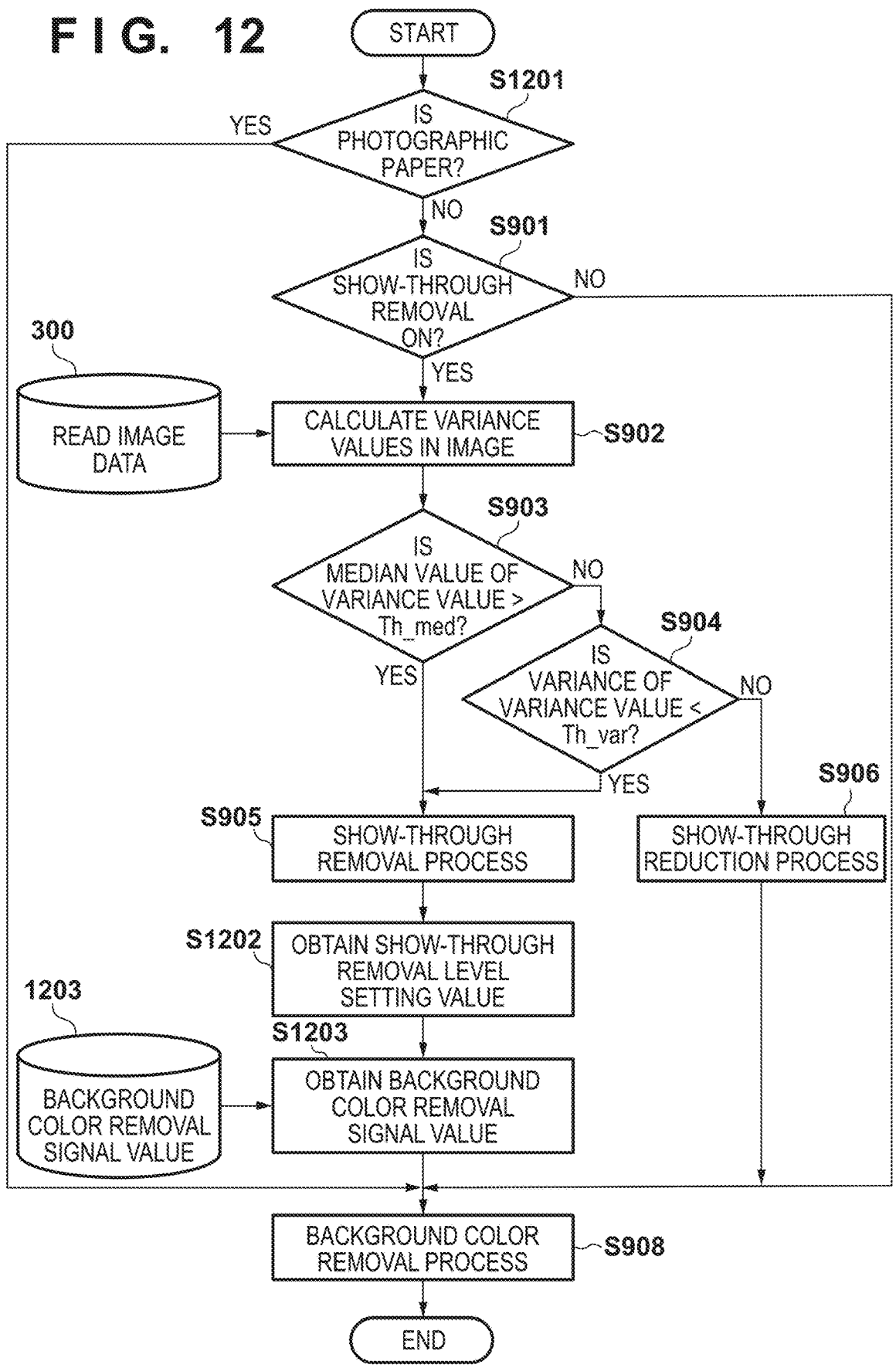
FIG. 12 is a view that illustrates a flow of processing according to an embodiment.

With reference to FIG. 12, description is given for a processing flow according to the present embodiment. The processing described below is realized by, for example, the control unit 101 loading a control program stored in the storage unit 107 into a work memory, and then executing the control program. Note that, processing similar to that of the flowchart of FIG. 9 described in the first embodiment above has the same step number added thereto, and description thereof is omitted.

In step S1201, the control unit 101 obtains information of an original type (a type of the original) set via a copy function screen (not shown), and determines whether the original type is photographic paper. If the original type is photographic paper, the image processing unit 103 proceeds to step S908 to execute a background color removal process without executing a show-through removal process, and then processing ends. In addition, similar processing is performed in the case of an original type for which it can be determined that there is no halftone dot structure. In contrast, if it is not photographic paper, the processing proceeds to step S901.

In addition, upon executing the show-through removal process in step S905, the processing proceeds to step S1202, and the control unit 101 confirms the setting details set via the adjustment screen 712 for show-through removal, and obtains a setting value. Next, in step S1203, the control unit 101 reads out from the storage unit 107 a background color removal signal value 1203 in accordance with the show-through removal level obtained in step S1202. Note that it is assumed that background color removal signal values according to background color removal level and show-through removal level have been saved in advance in the storage unit 107. Essentially, the greater the show-through removal level becomes, the more the background color removal signal value is adjusted to not remove a signal. A background color removal signal value that considers the show-through removal level can be generated by a calculation performed in advance in relation to an image that is processed by similar processing to the calculation of the background color removal signal value of step S907 using different show-through removal levels. In addition, it may be set by using, for example, an average value of values calculated from a plurality of images. Furthermore, the background color removal signal value may be set for each original type in addition to the background color removal level and the show-through removal level, and it is also effective to, if there is a setting for which it is necessary to change the background color removal signal value, set a value that considers such a setting.

As described above, by switching the show-through removal process and switching the background color removal signal value in accordance with conditions set by the UI 104, it is possible to suppress a reduction in quality of read image data (copied material) while improving the performance of processing by reducing the level of computational complexity of image processing.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-117311 filed on Jun. 20, 2018, which is hereby incorporated by reference herein in its entirety.

What is claimed is:

1. An image processing apparatus comprising:
a reader that reads an image of an original; and
a processor or a circuit that obtains a variance value of signal values of pixels included in the image of the original read by the reader,
wherein the processor or the circuit determines whether the read image has a halftone-dot region based on the variance value,
wherein, in a case where it is determined that the read image has the halftone-dot region, the processor or the circuit executes a first removal process for removing show-through of the original, the first removal process being a removal process for which the obtained variance value is used, and
wherein in a case where it is not determined that the read image has the halftone-dot region, the processor or the circuit executes a second removal process for removing show-through of the original, the second removal process being a removal process for which the obtained variance value is not used.

2. The image processing apparatus according to claim 1, wherein
wherein the processor or the circuit determines whether the read image has the halftone-dot region based on the obtained variance value and a threshold value,
wherein the threshold value includes a first threshold value relating to a median value of obtained variance values, and
wherein, in a case where the median value of the obtained variance values exceeds the first threshold value, it is determined that the read image has the halftone-dot region and in a case where the median value of the obtained variance values is less than or equal to the first threshold value, it is not determined that the read image has the halftone-dot region.

3. The image processing apparatus according to claim 2, wherein
the threshold value includes a second threshold value relating to variation of a frequency of appearance of obtained variance values,
wherein, in a case where the median value of the obtained variance values is less than or equal to the first threshold value and the variation of the frequency of appearance of the obtained variance values is less than the second threshold value, it is determined that the read image has the halftone-dot region, and
wherein, in a case where the median value of the obtained variance values is less than or equal to the first threshold value and the variation of the frequency of appearance of the obtained variance values is equal to or more than the second threshold value, it is not determined that the read image has the halftone-dot region.

4. The image processing apparatus according to claim 1, wherein
the first removal process is a removal process for which the obtained variance value and an average value of signal values of pixels included in the image are used.

5. The image processing apparatus according to claim 1, wherein
the second removal process is a removal process for which a color conversion table is used.

6. The image processing apparatus according to claim 1, wherein
the processor or the circuit further execute a background color removal process for removing a background color of the original after the first removal process or the second removal process is executed.

7. The image processing apparatus according to claim 6, wherein
the processor or the circuit adjusts a background color removal level of the background color removal process in accordance with a difference between signal values before and after executing the first removal process.

8. The image processing apparatus according to claim 7, wherein
the processor or the circuit sets the background color removal level in accordance with a user input.

9. The image processing apparatus according to claim 8, wherein
the processor or the circuit sets a strength level of the first removal process and the second removal process in accordance with a user input.

10. The image processing apparatus according to claim 1, wherein
the processor or the circuit does not execute the first removal process and the second removal process in a case where a type of the original indicates photographic paper.

11. The image processing apparatus according to claim 1, wherein
the second removal process is a removal process for which a 3D-LUT in which some output signal values of achromatic grid points of a color conversion table become white is used.

12. A method of controlling an image processing apparatus, the method comprising:
reading an image of an original;
obtaining a variance value of signal values of pixels included in the read image of the original;
determining whether the read image has a halftone-dot region based on the variance value;
in a case where it is determined that the read image has the halftone-dot region, executing a first removal process for removing show-through of the original, the first removal process being a removal process for which the obtained variance value is used; and
in a case where it is not determined that the read image has the halftone-dot region, executing a second removal process for removing show-through of the original, the second removal process being a removal process for which the obtained variance value is not used.

13. A non-transitory computer-readable storage medium storing a computer program for causing a computer to execute each step of a method for controlling an image processing apparatus, the method comprising:
reading an image of an original;
obtaining a variance value of signal values of pixels included in the read image of the original;
determining whether the read image has a halftone-dot region based on the variance value;
in a case where it is determined that the read image has the halftone-dot region, executing a first removal process for removing show-through of the original, the first removal process being a removal process for which the obtained variance value is used; and
in a case where it is not determined that the read image has the halftone-dot region, executing a second removal process for removing show-through of the original, the second removal process being a removal process for which the obtained variance value is not used.

* * * * *